(12) United States Patent
Katagiri

(10) Patent No.: US 6,491,449 B2
(45) Date of Patent: Dec. 10, 2002

(54) FILM FEEDING APPARATUS FOR CAMERA

(75) Inventor: Moriya Katagiri, Tokyo (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/872,677

(22) Filed: Jun. 1, 2001

(65) Prior Publication Data

US 2001/0051048 A1 Dec. 13, 2001

(30) Foreign Application Priority Data

Jun. 6, 2000 (JP) ........................................ 2000-169210

(51) Int. Cl.[7] ................................................ G03B 1/00
(52) U.S. Cl. ...................................... 396/418; 396/538
(58) Field of Search ................................. 396/415, 414, 396/418, 411, 538

(56) References Cited

U.S. PATENT DOCUMENTS

| 4,303,325 A | * | 12/1981 | Seely ........................ 396/415 |
|---|---|---|---|
| 4,397,535 A | * | 8/1983 | Harvey ....................... 396/396 |
| 4,954,859 A | * | 9/1990 | Kitazawa .................... 396/397 |
| 5,001,505 A | * | 3/1991 | Tosaka et al. ............... 396/418 |
| 5,361,116 A | * | 11/1994 | Funahashi ................... 396/319 |
| 5,555,050 A | * | 9/1996 | Wakabayashi et al. ....... 396/406 |
| 5,835,805 A | * | 11/1998 | Izaki et al. ................. 396/411 |
| 5,848,312 A | * | 12/1998 | Kitazawa et al. ........... 396/535 |
| 6,343,880 B1 | * | 2/2002 | Kamoda et al. ............ 396/411 |

FOREIGN PATENT DOCUMENTS

| JP | 60-100127 | 6/1985 |
|---|---|---|
| JP | 60-166940 | 8/1985 |

* cited by examiner

Primary Examiner—Russell Adams
Assistant Examiner—Michelle Nguyen
(74) Attorney, Agent, or Firm—Ostrolenk, Faber, Gerb & Soffen, LLP

(57) ABSTRACT

A film feeding apparatus for a camera has a spool chamber, a spool, and a motor. The spool is rotated in the spool chamber for winding up a film. The motor is arranged within the outer diameter of the film winding of the spool to expose the outer periphery in the spool chamber.

20 Claims, 4 Drawing Sheets

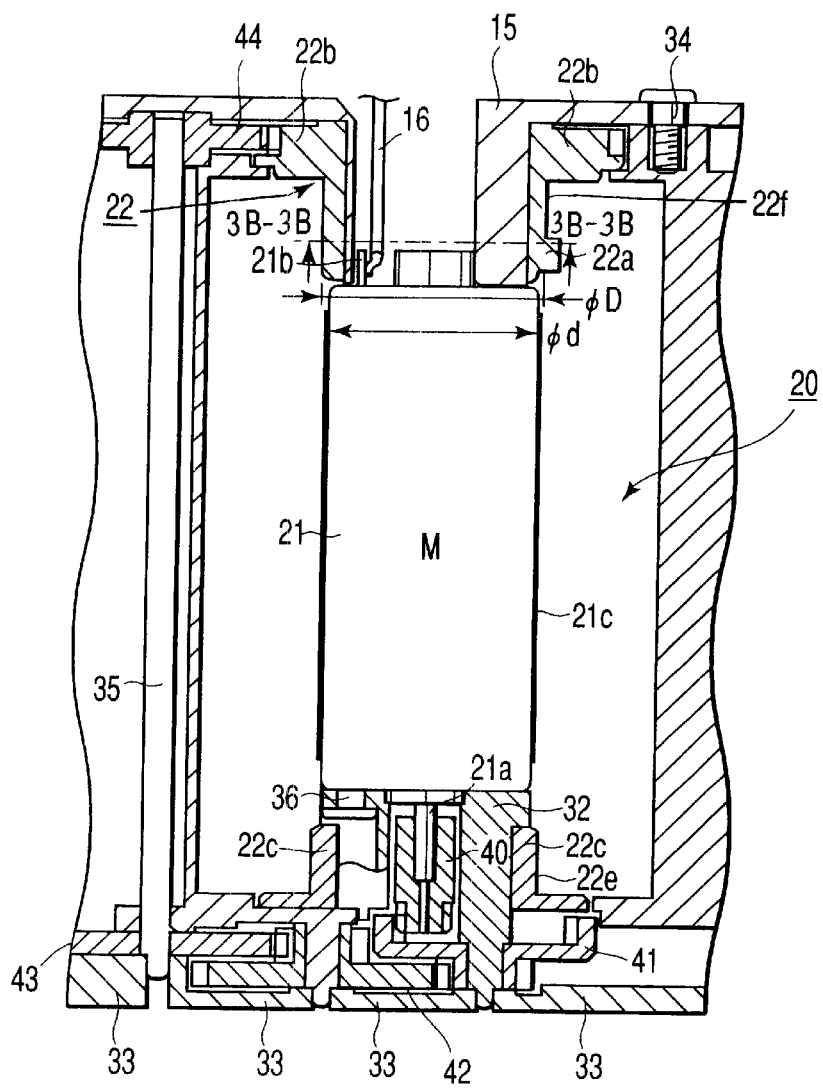
F I G. 3A
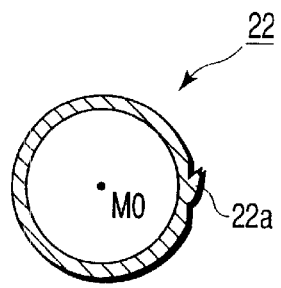
F I G. 3B

FILM FEEDING APPARATUS FOR CAMERA

CROSS-REFERENCE TO RELATED APPLICATIONS

This application is based upon and claims the benefit of priority from the prior Japanese Patent Application No. 2000-169210, filed Jun. 6, 2000, the entire contents of which are incorporated herein by reference.

BACKGROUND OF THE INVENTION

The present invention relates to a film feeding apparatus for a camera, and more particularly to a film feeding apparatus for a camera having a spool device.

As prior art associated with a film feeding apparatus, there is known, for example, a film feeding apparatus disclosed in Jpn. Pat. Appln. KOKAI Publication No. 60-166940.

This film feeding apparatus has a spool having a relatively small diameter as a spool device, but has a disadvantage in that applying the film feeding apparatus to a camera leads to an increase in the size of the camera itself because the motor is arranged at a location different from the spool chamber.

Furthermore, in a "motor incorporated spool" disclosed in Jpn. Pat. Appln. KOKAI Publication No. 60-100127, a motor and a spool are coaxially arranged, and this motor is incorporated into the spool. Thus, there is a disadvantage in that the diameter of the spool is increased and a large spool chamber is required so that the size of the camera is increased despite the fact that the space is more efficiently used.

In this manner, the conventional technology of the film feeding apparatus such as a spool device having a small diameter and a motor incorporated spool is capable of improving a usage efficiency of space in the spool chamber.

However, the motor incorporated spool inevitably requires a large spool chamber space because of the structure in which the motor is incorporated into the spool chamber. Despite the fact that such a structure is one factor which increases the size of the camera itself, no specific proposal is presented with respect to the structure of the spool chamber for settling such a problem.

BRIEF SUMMARY OF THE INVENTION

An object of the present invention is to provide a smaller size film feeding apparatus by arranging a spool and a motor or the like in a coaxial manner and reducing the diameter of the spool.

In order to attain the above object, according to one aspect of the present invention, there is provided a film feeding apparatus for a camera, the apparatus comprising:

a spool chamber;

a spool which rotates in the spool chamber for winding up a film; and a motor arranged within an outer diameter of the spool to expose its outer periphery to the wall or walls defining the spool chamber.

Furthermore, according to another aspect of the present invention, there is provided a film feeding apparatus for a camera, the apparatus comprising:

two spool members which mutually and coaxially rotate for winding up a film, the members being arranged in a mutually separated manner in an axial direction; and a motor having a diameter smaller than the outer diameter of each of the spool member, the motor being accommodated in a cylindrical area formed between the two spool members, the motor having an outer periphery exposed to the winding surface of the film.

Furthermore, according to another aspect of the present invention, there is provided a film feeding apparatus for a camera, the device comprising:

a spool chamber;

a spool which rotates in the spool chamber for winding up a film; and a column-like member which is arranged within the largest diameter of the spool for winding up a film, its surface being exposed to the outer peripheral wall of the spool chamber. invention, there is provided a film feeding apparatus or a camera, the device comprising:

a spool chamber; and a plurality of spools rotatably arranged in a separating manner above and below the spool chamber for winding up the film.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles f the invention.

FIG. 3A is a longitudinal sectional view showing a structure of a cross section of an essential portion in a film feeding apparatus for a camera according to a first embodiment of the present invention.

FIG. 3B is a cross sectional view showing in an enlarged state a portion of a spool pawl taken along the line 3B—3B of FIG. 3A.

DETAILED DESCRIPTION OF THE INVENTION

Figure 1:
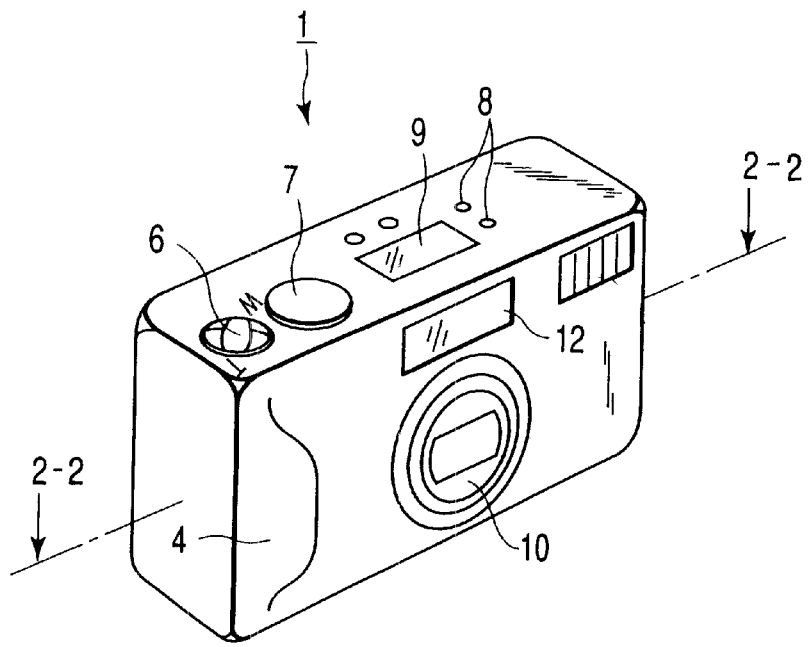
FIG. 1 s a perspective view showing an outer appearance of a camera 1 incorporating a film feeding apparatus for a camera according to the present invention.

Reference will now be made in detail to the presently preferred embodiments of the invention as illustrated in the accompanying drawings, in which like reference numerals designate like or corresponding parts.

First Embodiment

FIG. 1 is a view showing an outer appearance of a camera 1 incorporating a film feeding apparatus for a camera according to the present invention.

This camera 1 is, for example, a zoom-type automatic focus camera which is constituted in an easily portable manner, the camera comprising a lens barrel 10 which can be freely advanced and retreated from a camera main body.

Then, in this camera 1, a camera main body including a film feeding apparatus is protected with a front cover projectingly providing a grip portion 4, a rear cover (not shown), and a rear door engaged on the rear cover in a manner that the door can be freely opened and closed.

On an upper surface of the front cover, a zoom lever 6, a release 7, various kinds of setting buttons 8 and a display portion 9 comprising an LCD are arranged as shown in the drawings.

Above the lens barrel 10, a finder window 12 including a window for light measurement is arranged in parallel with an electronic flash window.

Figure 2:
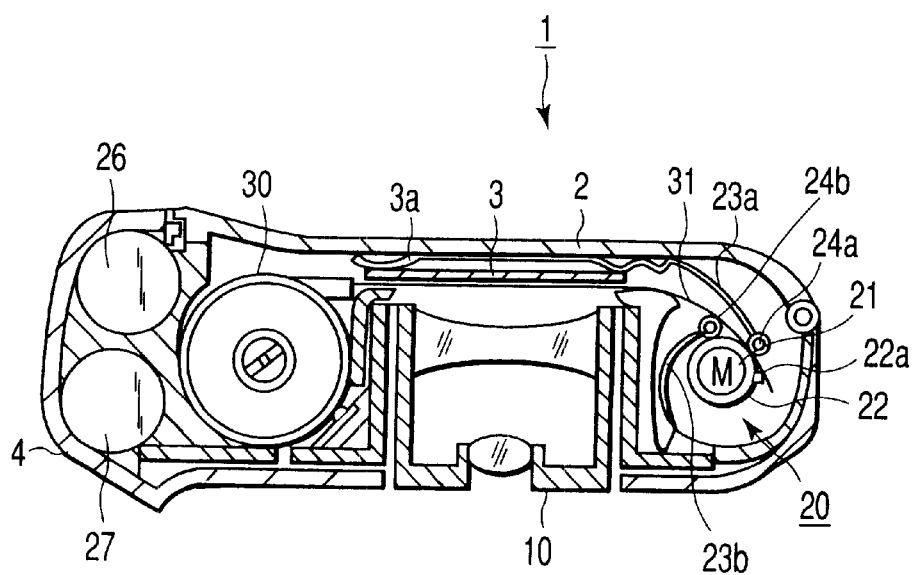
FIG. 2 is a cross sectional view showing a structure of a film feeding apparatus for a camera, the view showing a cross section of a camera taken along the line 2—2 of FIG. 1.

A film feeding apparatus for this camera 1 has a sectional structure as shown in FIG. 2 as the first embodiment.

Incidentally, FIG. 2 is a view showing a structure of a film feeding apparatus which is incorporated in this camera 1, the view showing a cross sectional view of the camera 1 taken along line 2—2 of FIG. 1.

The film feeding apparatus for this camera 1 is constituted in such a manner that a rear door 2 is closed after placing a film cartridge 30 in a film cartridge chamber while the film 31 is accommodated in a spool chamber 20 as follows:

That is, the apparatus has a structure constituted in such a manner that each frame of the film 31 is accordingly wound up by the winding of the end of the film 31 between the spools 22 (22c) in the spool chamber 20 along the film channel between the pressed plate 3 energized with a plate spring 3a and a rear end of the lens barrel 10.

The spools 22 (22c) each has a surface 22f (22e) for winding of the film.

Consequently, there are arranged guide plates 23a and 23b for guiding the film 31 correctly around the periphery of the spool 22, and rollers 24a and 24b in the spool chamber 20 as shown in the drawings.

An optical system 5 provided in the lens barrel 10 is arranged in a position relationship such that the optical axis of the optical system passes through the center on the film channel.

Furthermore, in the grip portion 4, a main capacitor 26 for an electronic flash and a battery 27 are arranged adjacent to each other while the film cartridge 30 can be accommodated adjacent to the main capacitor 26 and the battery 27.

FIG. 3A is a view showing a vertical section structure of an essential portion of the film feeding apparatus for a camera according to the first embodiment of the present invention.

In the vicinity of the center of the spool chamber 20, the motor 21 is arranged with the rotation shaft 21a of the motor projecting from the illustrated lower end, in a downward direction.

In this case, the illustrated lower end side of the motor 21 is fixed on the motor base 32 with a motor screw 36 to be set so as not to be moved.

Here, the illustrated upper end side of the motor 21 is pressed from above as shown with the spool lid 15 engaged with a screw 34.

Then, a pinion gear 40 is fixed on the rotation shaft 21a of the motor 21.

Further, a terminal 21b projecting from the illustrated upper end of the motor 21 is connected to a lead wire 16.

That is, a motor 21 is provided in a cylindrical space formed with a diameter of the spool 22 while the spool 22 is rotated on the side of the outer periphery of the spool lid 15.

Then, a plurality of gears 41 and 42 are rotatably meshed and supported on the gear base plate 33 which also serves as a bottom plate of a camera main body.

In detail, the rotation shaft 21a of the motor 21 is arranged along the rotation shaft M0 which coincides with the lengthwise direction. (See FIG. 3B).

Then, the pinion gear 40 attached on this rotation shaft 21a is meshed with the inner teeth of the gear 41.

The outer teeth (pinion portion) of this gear 41 are meshed with the spur gear of the adjacent gear 42.

The outer teeth (pinion portion) of this gear 42 are meshed with the gear 43 attached on the lower end of the shaft 35.

Thus, the rotation drive force from the rotation shaft 21a of the motor 21 is transmitted to the shaft 35.

Then, a transmission mechanism is constituted such that one of the spools 22 and 22c (spool 22 in this embodiment) separately provided above and below the spool chamber 20 is rotated and driven via a shaft 35 extending in a lengthwise direction in the vicinity of a partition wall of this spool chamber 20.

The spool 22 provided above as the first spool has a spool pawl 22a and a spool gear portion 22b.

The spool pawl 22a is provided in a convex manner on a part of the outer periphery of the spool 22 as shown in FIG. 3A and/or FIG. 3B.

This spool gear portion 22b is meshed with the gear 44 provided on an upper end portion of the shaft 35 to rotate the above spool 22 with a drive force from the motor 21 via a predetermined gear group (gears 41, 42, 43 and 44) and the shaft 35.

On the other hand, the spool 22c provided below as the second spool is coaxially provided on the rotation shaft M0. However, the spool 22c is not driven with the drive force from the motor 21, and is rotatably provided as a slave.

Incidentally, FIG. 3B is a view showing a cross section of the spool 22 taken along the line 3B—3B of FIG. 3A.

That is, one spool pawl 22a is projectingly provided vertically on the peripheral portion on an extension line passing through the rotation shaft M0 of the spool 22. The spool pawl 22a fits into a perforation (hole) of the film (not shown) while being rotated to provide a feeding force to the film.

In this manner, the spool device portion for winding up the film out of the film feeding apparatus has the motor 21 which serves as a drive source and a pair of (two) spools 22 and 22c arranged via a predetermined gear system (gears 41, 42, 43 and 44) so as to be rotated centering on this motor 21 on at least one end portion on both ends of this motor.

One of two spools (spool 22c in this case) is constituted in such a manner that the spool can be freely rotated with respect to the other spool (spool 22 in this case) on one end portion on the rotation shaft of the motor 21.

Furthermore, the above pair of spools 22 and 22c are integrally rotated in synchronization with the film with friction in the state in which film is wound upon the spools.

Incidentally, the motor 21 is formed, for example, in a cylindrical configuration. (With respect to the cross section configuration thereof, see FIG. 2).

Furthermore, the spools 22 and 22c are formed into a cylindrical configuration having a flange.

This cylindrical portion has a diameter φD slightly larger than the diameter φd of the motor 21.

Specifically, for example, the motor 21 having a diameter φd of 10 mm and a length of 25 mm is arranged in the center of the spool chamber 20.

Furthermore, the spools 22 and 22c each having a diameter φD of 10.6 mm are rotatably and coaxially arranged in the vicinity of both ends above and below the motor 21.

Figure 6:
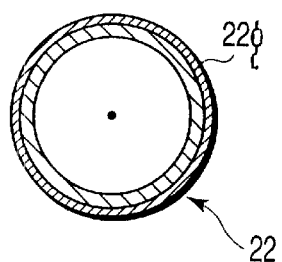
FIG. 6 is a cross sectional view showing in an enlarged state a portion of a spool as a variation of FIG. 3B.

Out of the above and below spools 22 and 22c, on at least one of the spools (particularly, the spool 22 on the drive side), a high friction body 22g formed of rubber or the like may be provided on an outer peripheral surface as shown in FIG. 6 instead of the spool pawl 22a extending on the side of the longitudinal direction of the film 31 in FIG. 3B.

Incidentally, the other spool 22c is constituted in such a manner that the spool 22c is rotated as a slave as described above, when the film 31 is wound around the spool 22.

In this manner, in the film feeding apparatus shown as an example in the first embodiment, the first spool and the second spool are rotatably and coaxially provided on both ends of the first spool and the second spool as the spools 22 and 22c of the spool chamber 20 for accommodating the film. Furthermore, the apparatus is constituted in such a manner that the motor 21 which serves as a rotation drive source is coaxially arranged between the first spool and the second spool.

Then, the apparatus is constituted in such a manner that the drive force transmission channel rotates only the spool 22 as the first spool via the above gear group (gears 41, 42, 43 and 44) while the second spool is rotated as a slave along with the winding up of the film 31.

With such an arrangement, the film 31 pulled out from the film cartridge 30 is wound around the coaxial motor 21 and the spools 22 and 22c in a roll-like manner.

However, a slight gap is provided between the peripheral surface of the motor 21 and the film surface so that the peripheral surface of the motor 21 does not come into contact with the film surface. Consequently, the surface of the film 31 is not scratched.

If even, the rear surface of the film 31 is scratched, no influence is done to the photographing surface of the film 31.

Furthermore, the film feeding apparatus shown as an example of the first embodiment is constituted in a structure in which the spool member is vertically divided into upper and lower portions and a motor 21 having a small diameter is arranged unlike the conventional motor incorporated spool covering the peripheral surface of the motor 21.

As a consequence, the spool member itself can be reduced in weight, the film can be wound up to a thin thickness. Thus a film feeding apparatus is provided in which the spool chamber 20 is effectively used.

Thus, the space efficiency in the camera main body is improved by incorporating such a film feeding apparatus in a camera or the like so that the camera itself can be reduced in size.

Incidentally, as with the first embodiment, the following variation can be put into practice.

For example, in the first embodiment, the film feeding apparatus (or the spool device) for a camera has been explained in the form of one example. The embodiment is not limited to the camera. This film feeding apparatus can be widely applied in machines other than a camera.

Then, the motor 21 can be used as a drive source not only for rotating and driving the spool 22 but also for driving other mechanisms when desired.

Furthermore, the motor 21 may be a motor for driving other mechanism which is not associated at all with the film feeding apparatus.

Incidentally, in the first embodiment, the outer periphery of the motor is exposed in the spool chamber. The motor can be made favorable in outer appearance by covering the outer periphery of the motor with a motor cover member 21c as shown in FIG. 3A.

In this case, as a material quality of the motor cover member 21c, a cylindrical synthetic resin having lubricating characteristic such as PTFE or the like is favorable.

This is intended to allow the film to slide on the peripheral surface of the motor cover member when the film is wound up with the spool.

According to the variations, the above structure is useful for reducing the size of the film feeding apparatus, and an equivalent effect or a better effect than the first embodiment can be expected.

Second Embodiment

Next, a second embodiment of the present invention will be explained.

However, here, only items other than those previously described will be explained.

Figure 4:
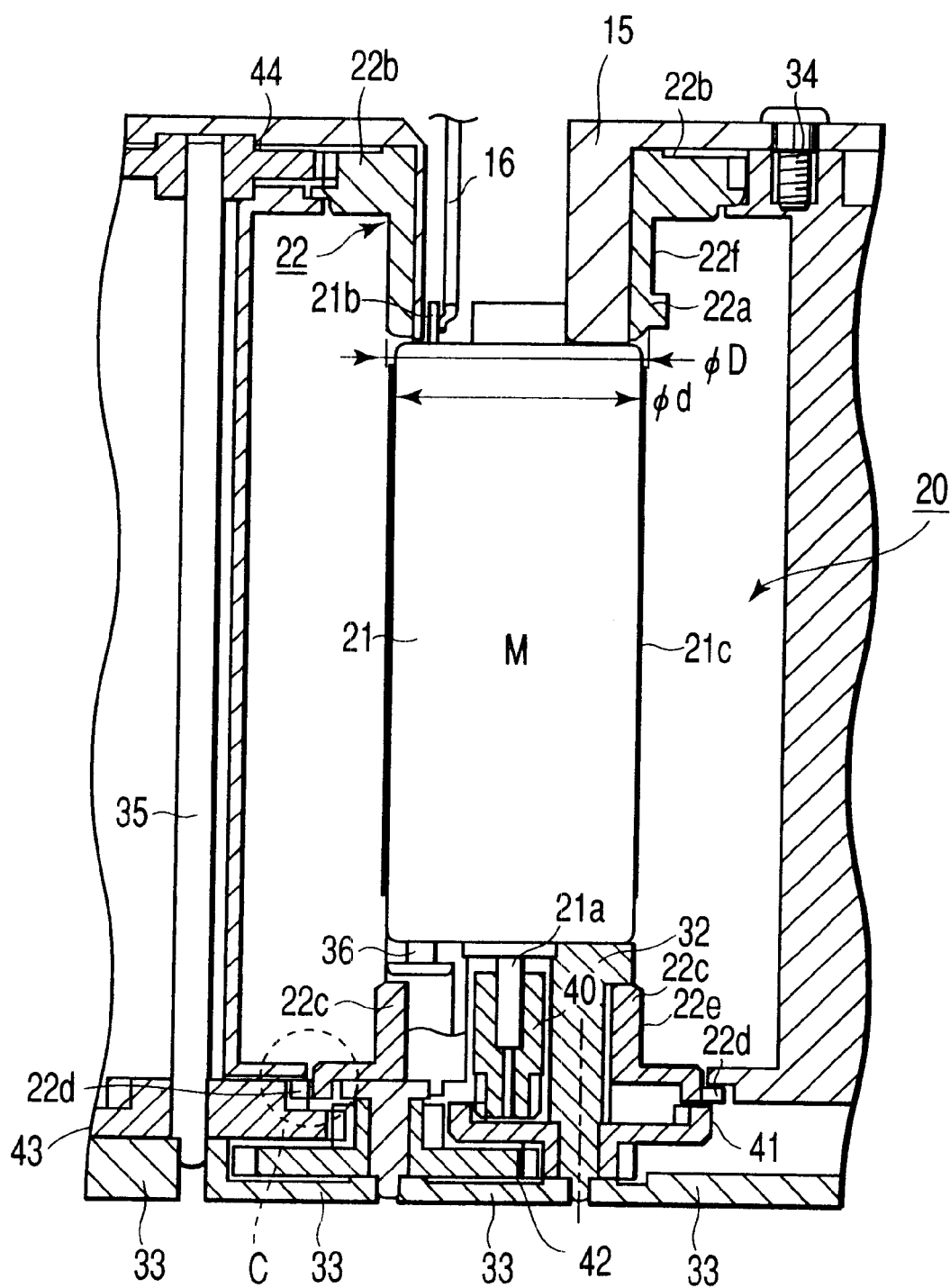
FIG. 4 is a longitudinal sectional view showing the structure of an essential portion in a film feeding apparatus for a camera according to a second embodiment of the present invention.

FIG. 4 is a longitudinal sectional view showing a structure of the film feeding apparatus for a camera according to the second embodiment.

This film feeding apparatus is one example which is constituted in such a manner that not only the spool 22 provided above the motor 21 but also the spool 22c provided below the motor 21 are rotatably driven.

In order to drive the spools 22 and 22c in this manner, the spool gear portion 22d is provided on the lower spool 22c while a predetermined gear system is provided for driving this spool gear portion 22d.

That is, the spool gear portion 22d is put into practice in a gear structure in which a drive force transmission channel which is different from that of the first embodiment is provided, which is meshed with the gear 43 to be driven at a position shown in the area C shown by a broken line in the drawing.

In a concrete configuration, outer teeth are formed on an outermost peripheral surface of the above spool 22c.

Then, a gear 43 having a pinion portion is rotatably provided at one end side of shaft 35 at a position meshing with the outer teeth on the outermost peripheral surface of this spool 22c.

With the rotation of the gear 43, the gear 44 provided on the other end of the shaft 35 and the spool gear 22b of the above spool 22 are meshed into each other to be rotated.

As a consequence, the spool 22 and the spool 22c are constituted to be synchronized while being rotated at both an upper and a lower location.

That is, the spool 22 and the spool 22c provided separately above and below the spool chamber 20 form a synchronization mechanism in which the spool 22 and the spool 22c are respectively synchronized to be rotatably driven via a shaft 35 extending in a lengthwise direction in the vicinity of the partition wall of this spool chamber 20.

In this manner, in the film feeding apparatus shown as an example in the second embodiment, the spool 22c as the second spool provided coaxially at a lower location on the rotation shaft M0 (see FIG. 3B) is also driven with the motor 21 via the above gear group (gears 41, 42 and 43).

That is, this motor 21 is used for a drive source for rotating and driving these spools 22 and 22c.

Since the pair of upper and lower spools are synchronized to be rotatably driven, irregularities in the winding of the film do not occur while the spool is rotated in a stable manner.

According to the second embodiment, it is possible to provide a film feeding apparatus for a camera which enables a reliable winding operation of the film while attempting to reduce the size of the film feeding apparatus by adopting the above structure.

Incidentally, in the above second embodiment, the following variation may be put into practice.

For example, the motor 21 may be arranged with the rotation shaft being directed upward, and the gear base plate 33 or the like may be provided at the upper portion thereof.

Besides, furthermore, the structure arrangement of the gear system may be appropriately changed when needed.

Of course, this motor 21 may be employed for driving other mechanism than the pair of spools 22, 22c.

This motor 21 may be a motor for driving another mechanism which is not associated with the film feeding apparatus at all.

Third Embodiment

Next, a third embodiment of the present invention will be explained.

However, only items which are different from the described first embodiment will be primarily described in detail in the same manner as the second embodiment.

Figure 5:
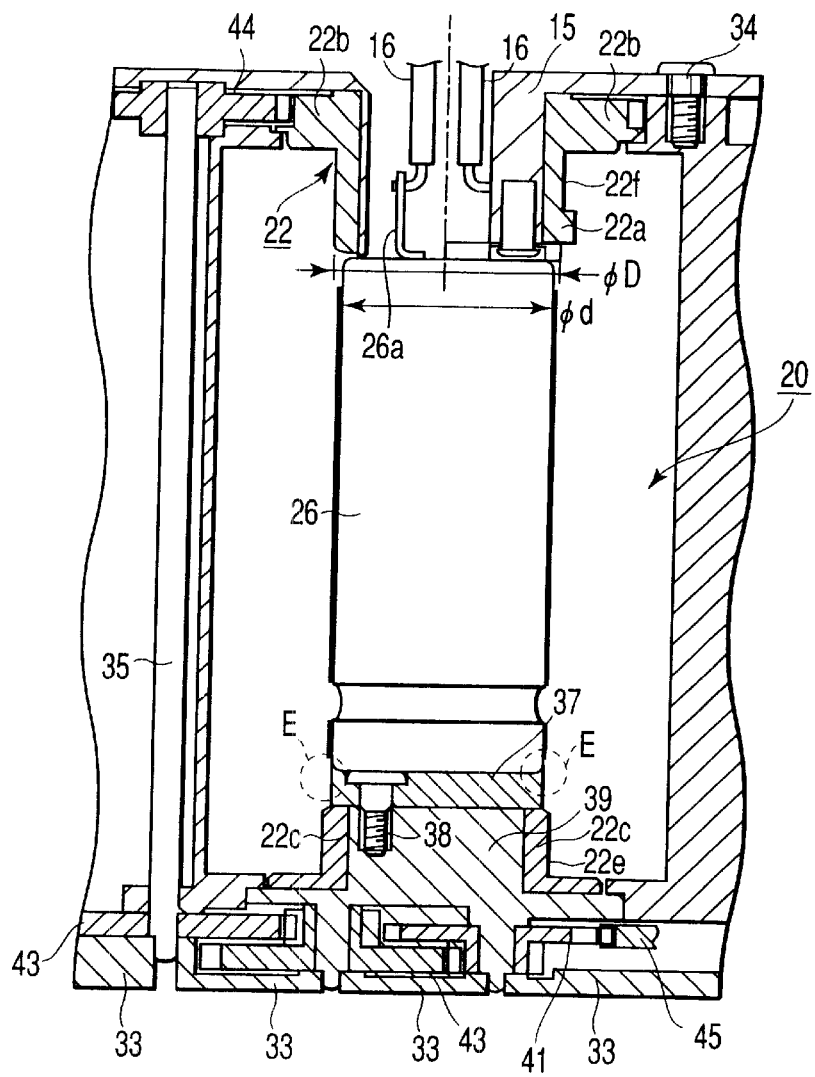
FIG. 5 is a longitudinal sectional view showing a structure of an essential portion of a film feeding apparatus for a camera according to a third embodiment of the present invention.

FIG. 5 is a longitudinal sectional view showing a structure of a film feeding apparatus for a camera according to a third embodiment.

In this embodiment, there is shown an example of a capacitor incorporated spool which is characterized in that a main capacitor 26 for an electronic flash is coaxially arranged between the first spool and the second spool.

As a consequence, in this case, a structure is adopted in which the main capacitor 26 is provided in the spool chamber 20. Thus, the structure may be such that, for example, the motor 21 as the drive source is arranged in a space adjacent to the battery 27 or the film cartridge 30 via a partition wall in the grip portion 4.

The main capacitor 26 for an electronic flash is arranged vertically in the vicinity or the center of the spool chamber 20.

In this case, the upper end of the main capacitor 26 is pressed from above in the state in which the capacitor terminal 26a (26b) fits into a portion of the spool lid 15 engaged with the camera main body with a screw 34.

Furthermore, the lower end of the main capacitor 26 is supported on a capacitor base 39 engaged with a capacitor screw 38 via the capacitor base 37.

In this case, the peripheral end portion of the capacitor base 37 is formed into a receiving configuration as shown by E of FIG. 5. Thus, an attempt can be made to stabilize the seating for the bottom portion of the main capacitor which is received here.

Furthermore, it is constituted so that the long axis of the main capacitor 26 coincides with the rotation shaft.

Lead wires 16 (one of which not shown) are connected respectively to the capacitor terminals 26a (26b) projecting to the upper end portion of this main capacitor 26.

Here, it is constituted so that the drive force is transmitted via the gear 45 from the drive source.

In detail, a plurality of gears 41, 42, 43 and 45 are rotatably or mutually meshed with each other to be supported on the gear base plate 33.

Then, the gear 45 is meshed with the gear 41 of the spur gear while the outer teeth (pinion portion) of the gear 41 is meshed with the spur gear of the adjacent gear 42 and the outer teeth (pinion portion) of this gear 42 is meshed with the gear 43 attached on the lower end of the shaft 35 to transmit the rotation drive force in the same manner.

Then, the spools 22 and 22c separately provided above and below the spool chamber 20 constitute a synchronization mechanism in which the spools 22 and 22c are respectively synchronized to be rotatably driven via a shaft 35 extending in a lengthwise direction in the vicinity of the partition wall of this spool chamber 20.

In the same manner as described above, the spool 22 (first spool) provided above the main capacitor 26 has a spool pawl 22a and a spool gear portion 22b.

This spool pawl 22a is provided in a convex configuration on a part of the periphery of the spool 22 as shown in FIG. 3B.

The spool gear portion 22b is constituted in such a manner that the portion 22b is meshed with the gear 44 on the upper end portion of the shaft 35 to be rotated with the drive force from the drive source (not shown) with the result that the spool 22 is rotated.

On the other hand, the apparatus is constituted in such a manner the spool 22c (the second spool) provided below the main capacitor 26 is provided coaxially with the main capacitor 26 and is driven via the above gear group (gears 41, 42, 43 and 44).

Incidentally, the main capacitor is formed, for example, in a circular configuration.

Further, the spools 22 and 22c are formed in a cylindrical configuration.

This cylindrical configuration has a diameter φD slightly larger than the diameter φd of the main capacitor 26.

For example, the main capacitor 26 having a diameter φd of 10 mm and a length of 25 mm is arranged in the center.

Besides, the spools 22, 22c each having a diameter φD of 10.6 mm are coaxially arranged on the upper and the lower end.

In this manner, in the film feeding apparatus according to the third embodiment, the first spool (22) and the second spool (22c) of the spool chamber 20 are rotatably and coaxially provided on both ends, and the film 31 pulled out from the film cartridge 30 is wound on the periphery of the coaxial main capacitor 26 and the spools 22 and 22c in a roll-like configuration by arranging the circular-like main capacitor 26 between the first spool and the second spool. Thus, the spool chamber 20 can be effectively used.

Furthermore, the peripheral surface of the main capacitor 26 does not come into contact with the film surface when the spool device winds up the film so that the surface of the film is not scratched.

Even if a scratch is done to the rear surface of the film 31 by the capacitor 26, the photographing surface of the film 31 is not affected.

That is, this structure can be referred to as a so-called "main capacitor incorporated spool" which covers the whole main capacitor 26. The spool member is divided in a vertical direction, and a main capacitor having a small diameter is arranged therebetween. Thus, the weight of the spool can be reduced.

Furthermore, this structure enables the film to be wound up to a thin thickness with the result that a film feeding apparatus can be provided in which the space in the spool chamber 20 is effectively used. Thus, the space efficiency in the camera main body incorporating the apparatus can be improved with the result that a reduction in the size of the camera can be realized.

With respect to the third embodiment, the following variation may be put into practice.

With such a variation, the equivalent or better effects as compared with the first and second embodiments described above can be expected.

That is, the idea of the above "main capacitor incorporated spool" can be developed into a coaxial structure with the spool in which members having a long shaft-like configuration such as a cylindrical configuration, a square column-like configuration or the like other than the motor 21 and the main capacitor 26 are assembled.

For example, the battery 27, other small capacitors are used in place of the main capacitor.

Alternatively, a small cylindrical motor and a capacitor may be coaxially assembled adjacent to each other. In this structure, the effects of a size reduction can be further improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A film feeding apparatus for a camera, comprising:
    a spool chamber defined by at least one wall that constitutes an outer periphery of the chamber;
    a spool which rotates in a spool chamber for winding up a film; and
    a motor arranged axially in line with the spool for winding up a film, the motor being exposed to the outer periphery of the spool chamber.

2. The apparatus according to claim 1, wherein the motor is arranged coaxially with the central axis of the spool.

3. The apparatus according to claim 1, wherein the motor drives the spool for winding up a film.

4. The apparatus according to claim 1, wherein the spool has a rubber member around an outer periphery portion thereof.

5. The apparatus according to claim 1, wherein the spool has a pawl which is engaged with a perforation of the film.

6. The apparatus according to claim 1, wherein the spool has an outer diameter and the motor has an outer diameter which is not greater than the outer diameter of the spool.

7. The apparatus according to claim 1, including first and second spool members rotatably arranged respectively on both ends of the motor in the spool chamber.

8. The apparatus according to claim 7, wherein the motor drives at least one of the first and the second spool members for winding up a film.

9. The apparatus according to claim 7, wherein the motor drives both the first and the second spool members for winding up a film.

10. The apparatus according to claim 7, wherein either of the first and the second spool members has a pawl which is engaged with perforations of the film.

11. A film feeding apparatus for a camera, comprising:
    two spool members which mutually and coaxially rotate for winding up a film, the members being arranged in a mutually separated manner in their axial directions; and
    a motor having a diameter smaller than the outer diameter of each of the two spool members, the motor being accommodated in a cylindrical area formed between the two spool members, the motor having an outer periphery exposed to the winding surface of the film.

12. The apparatus according to claim 11, wherein the motor drives at least one of the two spool members for winding up a film.

13. The apparatus according to claim 11, wherein the motor drives both of the two spool members for winding up a film.

14. The apparatus according to claim 11, wherein one of the two spool members has a pawl which is engaged with perforations of the film.

15. A film feeding apparatus for a camera, comprising:
    a spool chamber defined by at least one wall that constitutes an outer periphery of the chamber;
    a spool which rotates in the spool chamber for winding up a film; and
    a column-like member which is arranged axially in line with the spool for winding up a film, the column-like member being exposed to the outer periphery of the spool chamber.

16. The apparatus according to claim 15, wherein the column-like member is a capacitor.

17. The apparatus according to claim 15, wherein the column-like member is a motor for winding up a film.

18. The apparatus according to claim 15, wherein the column-like member is attached in a stable state.

19. The apparatus according to claim 15, in which the spool has an outer diameter and the column-like member has an outer diameter that is not greater than the outer diameter of the spool.

20. A film feeding apparatus for a camera, comprising:
    a spool chamber; and
    a plurality of spools rotatably arranged in a separated manner above and below the spool chamber for winding up a film.

* * * * *